United States Patent
Moon et al.

(10) Patent No.: US 10,152,236 B2
(45) Date of Patent: *Dec. 11, 2018

(54) HYBRID DATA STORAGE DEVICE WITH PARTITIONED LOCAL MEMORY

(71) Applicant: Seagate Technology LLC, Cupertino, CA (US)

(72) Inventors: John Edward Moon, Superior, CO (US); Leata Blankenship, Longmont, CO (US); Greg Larrew, Berthoud, CO (US); Stanton M. Keeler, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,205

(22) Filed: Feb. 15, 2018

(65) Prior Publication Data

US 2018/0173427 A1    Jun. 21, 2018

Related U.S. Application Data

(63) Continuation of application No. 15/249,866, filed on Aug. 29, 2016, now Pat. No. 9,927,981.

(51) Int. Cl.
*G06F 13/00*    (2006.01)
*G06F 3/06*    (2006.01)

(52) U.S. Cl.
CPC .......... *G06F 3/0608* (2013.01); *G06F 3/0647* (2013.01); *G06F 3/0659* (2013.01); *G06F 3/0685* (2013.01)

(58) Field of Classification Search
CPC .... G06F 3/0608; G06F 3/0647; G06F 3/0659; G06F 3/0685
See application file for complete search history.

(56) References Cited

U.S. PATENT DOCUMENTS

| | | | |
|---|---|---|---|
| 8,639,872 B1 | 1/2014 | Boyle et al. |
| 8,661,194 B2 | 2/2014 | Nam |
| 9,009,393 B1 | 4/2015 | Sutardja |
| 2010/0088459 A1 | 4/2010 | Arya et al. |
| 2014/0207996 A1 | 7/2014 | Fisher et al. |

*Primary Examiner* — Charles Rones
*Assistant Examiner* — Han Doan
(74) *Attorney, Agent, or Firm* — Hall Estill Attorneys at Law (57) ABSTRACT

Apparatus and method for managing data in a hybrid data storage device. In some embodiments, the storage device has a hard disc drive (HDD) controller circuit coupled to non-volatile rotatable storage media and a solid state drive (SSD) controller circuit coupled to non-volatile solid state memory. A local volatile memory has separate HDD and SSD partitions respectively accessible by the HDD and SSD controller circuits. A top level controller circuit performs a cleaning operation to transfer a data set from the non-volatile solid state memory to the rotatable storage media by issuing a read command to the HDD controller circuit to retrieve the data set to the HDD partition, transferring the data set from the HDD partition to the SSD partition, and issuing a write command to the SSD controller circuit to write the data set from the SSD partition to the non-volatile solid state memory.

20 Claims, 6 Drawing Sheets

HYBRID DATA STORAGE DEVICE WITH PARTITIONED LOCAL MEMORY

RELATED APPLICATION

The present application is a continuation of co-pending U.S. patent application Ser. No. 15/249,866 filed Aug. 29, 2016.

SUMMARY

Various embodiments of the present disclosure are generally directed to a hybrid data storage device that utilizes internal data transfer techniques to transfer data between different memory storage structures.

In some embodiments, the hybrid data storage device has a hard disc drive (HDD) controller circuit coupled to non-volatile rotatable storage media and a solid state drive (SSD) controller circuit coupled to non-volatile solid state memory. A local volatile memory has separate HDD and SSD partitions respectively accessible by the HDD and SSD controller circuits. The HDD partition is not accessible by the SSD controller and the SSD partition is not accessible by the HDD controller. A top level controller circuit performs a cleaning operation to transfer a data set from the non-volatile solid state memory to the rotatable storage media by issuing a read command to the HDD controller circuit to retrieve the data set to the HDD partition, transferring the data set from the HDD partition to the SSD partition, and issuing a write command to the SSD controller circuit to write the data set from the SSD partition to the non-volatile solid state memory.

In further embodiments, a method includes partitioning a local memory of a hybrid data storage device into a hard disc drive (HDD) partition and a solid state drive (SSD) partition. The HDD partition is coupled to an HDD controller circuit which in turn is coupled to non-volatile rotatable storage media. The SSD partition is coupled to an SSD controller circuit which in turn is coupled to non-volatile solid state memory. The HDD partition is not accessible by the SSD controller and the SSD partition is not accessible by the HDD controller. A top level controller circuit is adapted to process data access commands from a host device coupled to the hybrid data storage device. The top level controller circuit operates to perform a cleaning operation to internally transfer a data set stored in the non-volatile solid state memory to the non-volatile rotatable storage media by issuing a read command to the HDD controller circuit to retrieve the data set to the HDD partition, transferring the data set from the HDD partition to the SSD partition, and issuing a write command to the SSD controller circuit to write the data set from the SSD partition to the non-volatile solid state memory.

These and other features and aspects of various embodiments of the present disclosure can be understood upon a review of the following detailed description in conjunction with the associated drawings.

DETAILED DESCRIPTION

The present disclosure generally relates to data storage systems, and more particularly to the management of internal data transfers in a hybrid data storage device.

Data storage devices operate to store and retrieve computerized user data in a fast and efficient manner. Data storage devices can utilize a variety of different types of storage media, including rotatable recording discs of the type commonly used in hard disc drives (HDDs) and solid state semiconductor memory of the type commonly used in solid state drives (SSDs).

So-called hybrid data storage devices utilize two or more distinct forms of non-volatile storage media to store user data. Some forms of hybrid data storage devices (HDSDs, also sometimes referred to as solid state hybrid drives, or SSHDs) utilize a main memory formed from rotatable magnetic recording media (e.g., magnetic discs) and a smaller auxiliary memory formed from solid state (e.g., flash) memory cells. Both forms of storage media provide a combined non-volatile storage space to store user data transferred to the device from a host.

Hybrid devices are designed to combine the benefits of low cost mass storage afforded by rotatable magnetic recording media with the faster transfer rate performance provided by solid state memory (e.g., flash). It is common to operate a hybrid device in such a way that high priority data tend to be stored in the solid state memory since such memory tends to provide faster data transfer rates as compared to the relatively slower rotatable media. Ideally, hybrid devices should provide faster overall transfer rate performance that conventional HDDs and should be significantly less expensive than SSDs. The ratio of solid state memory to rotatable storage in a hybrid device can vary, but usually the amount of storage capacity provided by the solid state memory is on the order of about 1-2% of the size of the rotatable media. Other relative values and ratios can be used as desired.

While hybrid devices have been found operable in providing enhancements in the overall data transfer capacity of a storage device as compared to an HDD, there are a number of limitations that have been found to be unique to hybrid devices that are not easily resolved. It is well established that current generation SSDs can sustain significant data transfer rates, such as on the order of 400 megabytes (MB, $10^9$ bytes) per second (MB/s) or more. Depending on a number of factors, rotatable disc HDDs can sustain data transfer rates that are perhaps 10-15% of an SSD.

It might be expected that hybrid drives would provide significantly better transfer rate performance than HDDs due to the inclusion of the solid state memory which, if properly managed, should result in significant increases in the overall data rate for the device. After all, the solid state memory in a hybrid device will tend to have native transfer rates consonant with those of SSDs, and the most active data sets will be maintained in the solid state memory of the hybrid device. Conventional wisdom would further suggest that increasing the ratio of the solid state memory in a hybrid device, such as to 20-25% or more of the native disc capacity, would tend to further enhance the overall data transfer rate of the hybrid device. In practice, this has not generally been the case.

One limitation associated with hybrid devices is that, as noted above, the faster solid state memory only constitutes a small proportion of the overall total storage capacity of the device. Thus, unlike an SSD where all data stored by the device will be resident in the solid state memory, only a small portion of the available data will be stored in the solid state memory in a hybrid device, and this data will change over time. There is accordingly a large processing overhead required to identify, track and manage the data stored in the solid state memory. Increasing the size of the solid state memory would increase this overhead processing burden and could potentially result in a slower overall transfer rate.

Another unique property associated with most hybrid devices is that all data sets received by a hybrid device will usually also be stored by the rotatable media. Even if data are initially stored in the flash memory, a backup copy will be written to disc using a process sometimes referred to as data cleaning. In a similar fashion, sometimes data sets initially stored to the disc media will be migrated, or promoted, to the flash (so called "data pinning"). Data cleaning and pinning operations are usually carried out in the background during normal device operation, and can significantly add to the overall command loading of the device.

Accordingly, various embodiments of the present disclosure are generally directed to an apparatus and method for operating a hybrid data storage device (HDSD or SSHD) in such a way that overcomes these and other limitations associated with the existing art by partitioning a local memory buffer space (such as a DRAM buffer) into separate sections for use by different internal controllers associated with different media of the device.

As explained below, some embodiments provide a hybrid device with a hard disc drive (HDD) controller circuit that is coupled to non-volatile rotatable storage media (such as a magnetic disc). The hybrid device further has a solid state drive (SSD) controller circuit coupled to non-volatile solid state memory (such as flash). A volatile memory (such as DRAM) is respectively coupled to the HDD and SSD controller circuits to cache data during transfers associated with the rotatable storage media and with the solid state memory.

A top level controller circuit is operably coupled to an interface connector of the hybrid device. Generally, the top level controller directs various access commands received from a host to the HDD and SSD controllers; for data to be stored to disc, the top level controller passes the associated access commands to the HDD controller for ordering in an HDD command queue. For data to be stored to flash, the top level controller passes the associated access commands to the SSD controller for ordering in an SSD command queue. The HDD and SSD controllers process the received access commands in the respective queues to transfer the associated data between the DRAM and the disc and flash, respectively. These actions are carried out concurrently and independently along dual parallel data processing paths.

The DRAM is segmented into different partitions, with a first partition dedicated to the caching of data for storage by the rotatable storage media and a second partition dedicated to the caching of data for storage by the solid state memory. The top level controller can access both partitions. The HDD controller can only access the first partition and the SSD controller can only access the second partition.

The top level controller monitors the operation of the respective HDD and SSD controllers, and periodically forwards data cleaning commands to the HDD controller to internally transfer data initially stored in the flash memory to the disc memory. Concurrently, the top level controller periodically forwards data pinning commands to the SSD controller to internally transfer data stored in the disc memory to the flash memory.

Internal data transfers are handled using one or more data structures stored in a suitable memory location that respectively indicate the current contents of the respective DRAM (or other local memory), the disc media, and the flash memory. These data structures may include a linked list having forward pointers to enable the top level controller to quickly identify the contents of the flash memory during host access, cleaning and pinning operations.

It is contemplated that, regardless whether a given access command from the host is a read command or a write command, the top level controller will search the data structure (such as the linked list) to assemble a logical sequence that shows which ranges of logical addresses are currently present in the flash in order to help determine where the data should be stored in the case of a write operation or where the data can be retrieved from in the case of a read operation.

For example, a write command that identifies a selected LBA may be directed to the flash if the data structure indicates that the selected LBA, or one having sequential proximity to the selected LBA, is currently stored in the flash memory. This is based on the recognition that, if the selected LBA is in the flash, it is likely high priority data and therefore placing that data in the flash may result in higher effective I/O rates. Similarly, if the command is a read command, and the requested LBA is in the flash, the data can be retrieved much faster from the flash than from the disc.

The data structure is updated continuously as additional data sets are written to the flash. The top level controller may utilize the data structure to make decisions with regard to what data should be placed into the flash. While cleaning transfers from flash to disc are governed by the requirement that all data must ultimately be written to disc to provide archive protection, pinning transfers from disc to flash may be selectively based on heuristics determined by the top level controller, such as through the use of an access command history, etc.

The partitioned DRAM (or other local memory) allows for optimized, independent operation of both data channels associated with the respective media (disc and flash). Exception conditions associated with a selected controller can be handled by redirecting all data access commands to the other controller in a seamless and immediate fashion. The top level controller directs the placement of data in the appropriate partition of the DRAM and manages the overall state of the system.

Figure 1:
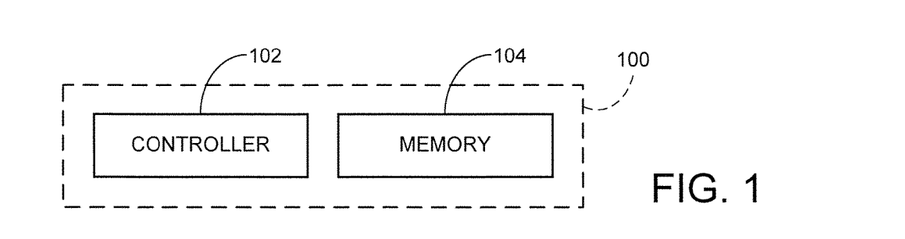
FIG. 1 is a block diagram for a data storage device characterized as a hybrid storage device in accordance with various embodiments.

These and other features and advantages of various embodiments can be understood beginning with a review of FIG. 1 which shows an exemplary data storage device 100. The data storage device 100 includes a controller 102 and a memory 104. The controller 102 is a control circuit that provides top level control functionality for the storage device, and may be realized in hardware, software and/or firmware. The controller circuit may constitute one or more programmable processors having associated programming instructions stored in a memory which, when executed, cause the processor(s) to carry out various control functions as explained herein. Other forms of controller circuit can be utilized, such as hardware circuits, programmable gate arrays, logic networks, application specific integrated circuits (ASICs), system on chip (SOC) devices, etc. As will be recognized, these and other forms of controller circuits may be formed of various logic, storage and switching elements using semiconductor fabrication techniques.

The memory 104 provides non-volatile memory storage for user data transferred to the storage device by a host device. The memory may incorporate a number of different types of non-volatile storage such as solid-state memory (e.g., flash), rotatable storage media, etc. For purposes of the present illustrative example, the device 100 is contemplated as comprising a hybrid data storage device (HDSD or SSHD) so that the memory 104 includes both rotatable storage media and solid state semiconductor memory. While not limiting, the rotatable media are contemplated as magnetic recording media and the solid state memory is contemplated as flash memory. Other arrangements can be used.

Figure 2:
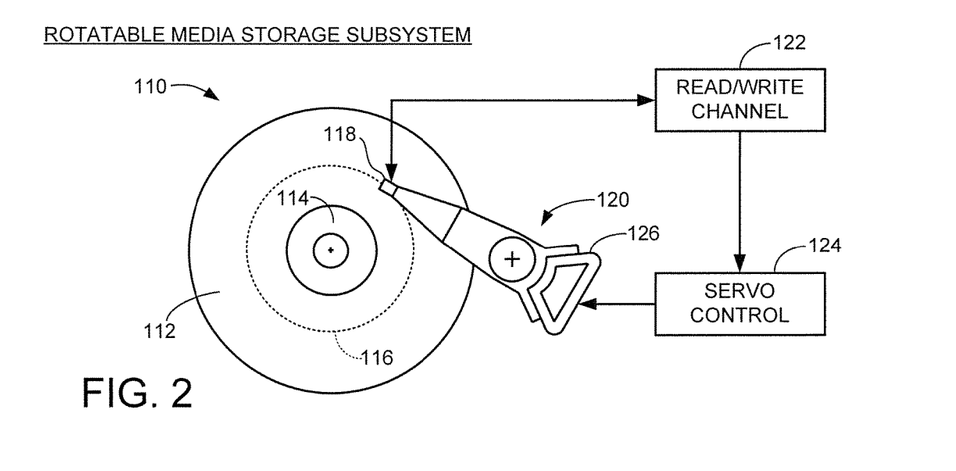
FIG. 2 is an isometric depiction of a rotatable media storage subsystem of the hybrid storage device of FIG. 1 constructed and operated in accordance with some embodiments.

FIG. 2 shows a rotatable media storage subsystem 110 of the memory 104 of FIG. 1 in accordance with some embodiments. The subsystem 110, also sometimes variously referred to as rotatable media or the disc, constitutes aspects of a hard disc drive (HDD) storage system. Various other elements may be incorporated into the subsystem so the diagram is illustrative and not limiting.

One or more rotatable magnetic recording discs 112 are fixed for rotation about a central axis of a spindle motor 114. A number of concentric tracks 116 are arranged on each of the disc surfaces and are accessed by a data read/write transducer (head) 118.

Each head 118 is moved across the surface of the disc using a rotary actuator 120. A read/write (R/W) channel circuit 122 provides write currents to and receives transduced readback signals from each head during respective write and read operations. A servo control circuit 124 provides closed loop positional control of the position of the heads 118 using embedded servo data (not separately shown) from the disc surfaces. The servo circuit 124 applies current to a coil 126 of a voice coil motor (VCM) to adjust the position of a selected head accordingly.

Figure 3:
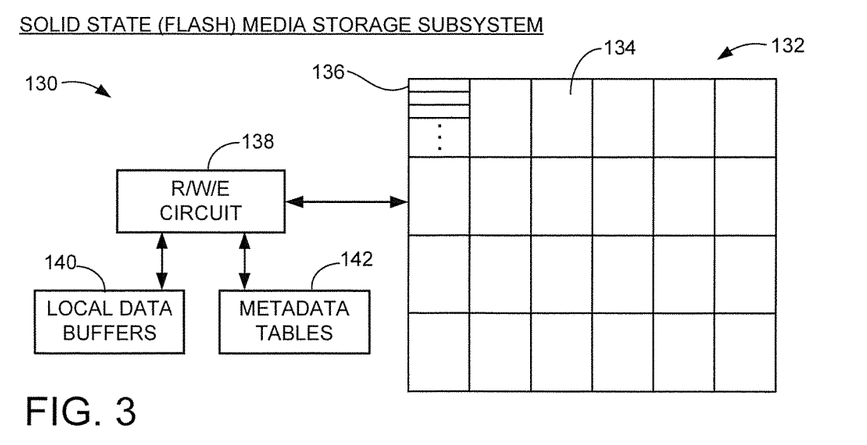
FIG. 3 is an isometric depiction of a solid state (flash) media storage subsystem of the hybrid storage device of FIG. 1 constructed and operated in accordance with some embodiments.

FIG. 3 shows a solid state media storage subsystem 130 of the memory 104 of FIG. 1 in accordance with some embodiments. The subsystem 130 is also sometimes referred to as solid state media or the flash, and is generally arranged as aspects of a solid state drive (SSD) storage system. Various other elements may be incorporated into the subsystem so the diagram is illustrative and not limiting.

The solid state media 130 includes a flash array 132 of flash memory cells arranged into rows and columns. The flash cells are grouped into erasure blocks 134, each constituting a smallest unit of the flash array that can be erased as a unit. Each erasure block 134 is formed from individual pages (row) 136 of memory cells to which fixed sized blocks of data may be written.

A read/write/erase (R/W/E) circuit 138 directs data transfers to and from the respective pages 136, and performs data migrations and erasures during garbage collection operations. A number of local data buffers 140 in the form of volatile memory serve to temporarily buffer data during such activities. Local volatile memory 142 can further be used to load, store and utilize metadata to track the locations and revision levels of various data sets stored in the array 132.

Figure 4:
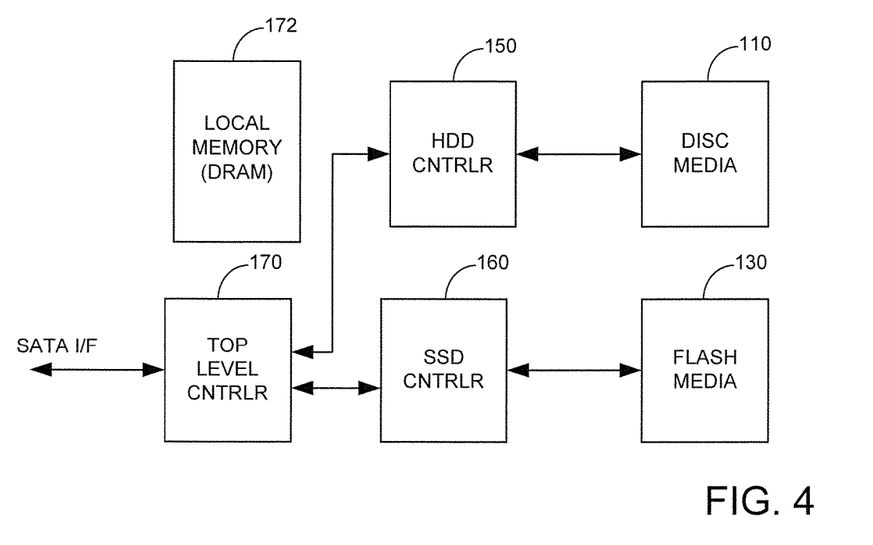
FIG. 4 shows an arrangement of the controller circuitry from FIG. 1 in accordance with some embodiments.

FIG. 4 provides a top level architecture for the device 100 in accordance with some embodiments. The disc media subsystem 110 from FIG. 2 is controlled by an HDD controller circuit 150, and the flash media subsystem 130 from FIG. 3 is controlled by an SSD controller circuit 160. Top level control of these controllers is in turn provided by a top level controller circuit 170. As mentioned above, these respective controller circuits are incorporated into the general controller 102 of FIG. 1 and may be variously realized as discussed above. It is contemplated albeit not necessarily required that these respective control circuits are physically realized as separate programmable processors or hardware processing circuits. The various circuits may be incorporated into a consolidated system on chip (SOC) integrated circuit device.

FIG. 4 further shows a local buffer memory (DRAM) 172. The DRAM is coupled to the respective controllers 150, 160 and 170 and is arranged to store user data during data transfer operations. The DRAM 172 may store other forms of data as well, including programming utilized by the various controllers, control parameters, metadata, state data, etc.

Without limitation, the architecture as shown in FIG. 4 can be characterized as an SSD with an attached auxiliary HDD subsection. That is, from an architectural standpoint, a primary data path is provided via the top level controller 170, SSD controller 160 and flash media 130. This is true even though the total data storage capacity of the flash media 130 is contemplated as being significantly smaller than the total data storage capacity of the disc media 110. In some embodiments, the flash capacity is less than about 5%, and more in the range of about 1-2%, of the disc capacity. This is not limiting, however, as any respective ratios of solid state memory capacity and rotatable storage data capacity can be accommodated by this embodiment. In some cases, the top level controller 170 may emulate host commands to the HDD controller circuit 150 so that the HDD controller circuit operates as if it is responding directly to the connected host device, but such transfer commands are mediated by the top level controller.

Figure 5:
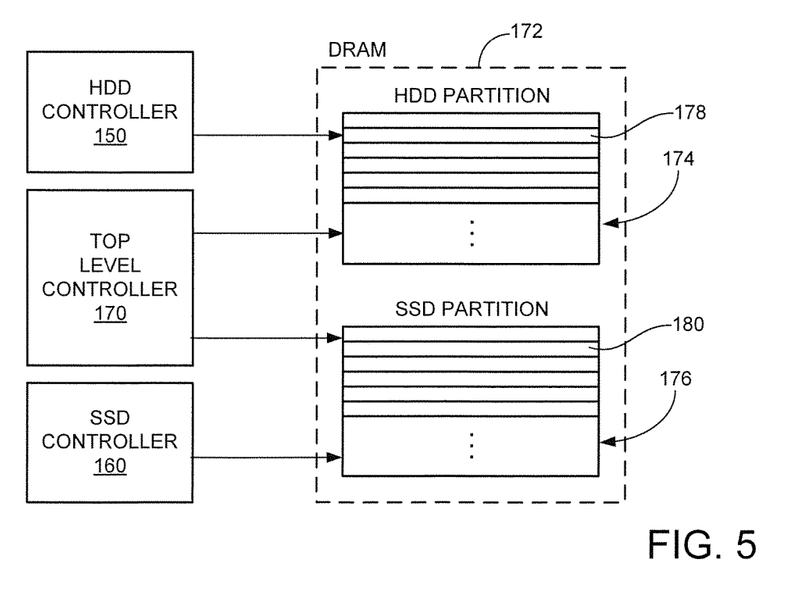
FIG. 5 shows an arrangement of the respective top level, HDD and SSD controller circuits and local memory from FIG. 4 in greater detail.

FIG. 5 shows the respective controllers 150, 160 and 170 in conjunction with the DRAM 172. The DRAM 172 is partitioned into separate sections, including an HDD partition 174 for use by the HDD controller 150 and an SSD partition 176 for use by the SSD controller. Additional partitions may be provided such as for programming, control data, etc. but are omitted for clarity. Other arrangements of the local memory can be used. It is contemplated that each partition has separate access rights assigned thereto; the top level controller 170 can access all partitions, while the HDD controller 150 can only access the HDD partition 174 and the SSD controller 160 can only access the SSD partition 176.

The HDD partition 174 includes a number of addressable cache lines (pages) 178 configured to store data blocks pending transfer between the rotatable media 110 and the host device. The SSD partition 176 similarly includes addressable cache lines (pages) 180 configured to store data blocks pending transfer between the flash media 130 and the host device. The respective cache lines 178, 180 may be of a common size or may be different sizes. The internal management of the respective partitions will be governed by the physical configuration of the DRAM as well as the protocols implemented by the top level controller.

Figure 6A:
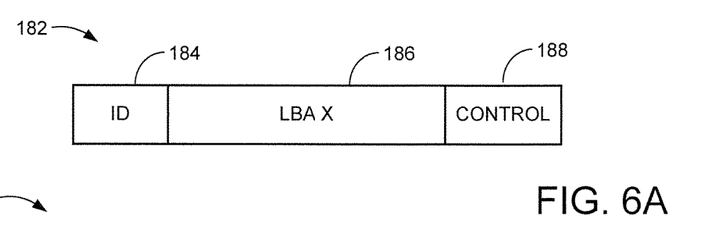
FIG. 6A illustrates an exemplary format of a data block that may be stored in the HDD partition of FIG. 5.
Figure 6B:
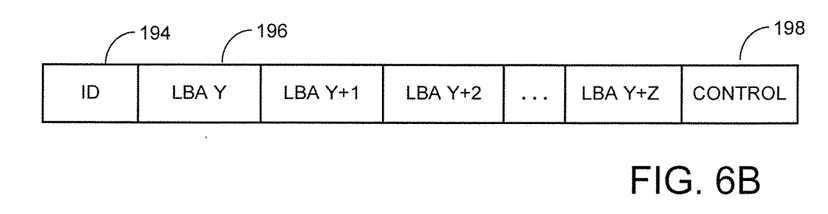
FIG. 6B illustrates an exemplary format of a data block that may be stored in the SSD partition of FIG. 5.

FIGS. 6A and 6B show exemplary formats for the data blocks stored by the respective cache lines 176, 178. A single data block may be stored per cache line, multiple data blocks may be stored per cache line, and data blocks may wrap to additional cache lines as required. Regardless, the data are generally arranged in a suitable format for the target media.

More particularly, FIG. 6A illustrates a data block 182 for the HDD partition that includes an ID field 184, a data field (LBA X) 186 and a control field 188. The data block 182 may be arranged to store an entire sector's worth of data, such as 512 bytes of user data in the data field 186. The ID field 184 may supply a suitable identification (ID) value, such as a logical address (e.g., a logical block address, LBA or a virtual block address, VBA), key block address value, etc. that uniquely identifies the user data in the data field 186 at the host level. For reference, the user data in field 186 is identified as LBA X.

The control data field 188 is optional and may provide additional data for use in identifying the user data, such as revision levels, parity values, status values (e.g., valid, stale, etc.) and so on. The size and arrangement of the data block 182 is selected to be accommodated by the rotatable media of the disc section 110. The write channel electronics may strip elements of the block (such as the LBA ID value if that value is not written to the media) and insert additional elements such as intersector gap control values, sync patterns, error correction codes (ECC), etc. as the data are encoded and written to the disc surfaces. Data structures that indicate the relationship between the logical address of the data (e.g., the LBA value) and the physical address of the data (e.g., head, cylinder, track, index reference count, etc.) are maintained by the system for subsequent reference during a read operation.

FIG. 6B shows a corresponding exemplary arrangement for a data block 192 written to a page of memory in the flash media section 140. The arrangement is similar in some ways to the data block 182 from FIG. 6A in that the data block 192 includes an ID field 194, a plurality of data fields 196 (for LBAs Y to Y+Z), and a control field 198. In this case, it is contemplated that an entire page's worth of user data, such as 4096 bytes, will be written at a time to the flash memory. The ID field 192 can identify the range of LBAs encompassed in the data block 192, and the control field 198 can provide various control data for the data set such as parity/correction values, status values, etc. If the host uses a first size of data sector, such as 512 bytes, then an integer multiple number of sectors may be stored in each page of flash memory (such as eight (8) sectors, as 512*8=4096).

As before, the SSD controller 160 will direct the writing of the encoded data from the data block 192 to a suitable location in the flash memory and maintain an LBA-PBA conversion data structure in local memory, where PBA is the physical block address of the data which may be arranged as die, array, GCU, erasure block, page number, offset, etc.

At this point it will be noted that other arrangements for the data blocks 182, 192 can be utilized so that the generalized formats shown in FIGS. 6A-6B are merely for purposes of illustration and are not limiting. It will also be recognized that the user data maintained in the DRAM partitions 174, 176 will generally be in an unencoded format, so that the respective encoding (e.g., run length limiting, compression, encryption, ECC generation, etc.) is applied to the user data prior to writing. During a subsequent readback operation, signal processing is applied to successively remove the encoding and return the originally presented data to the respective DRAM partition.

Figure 7:
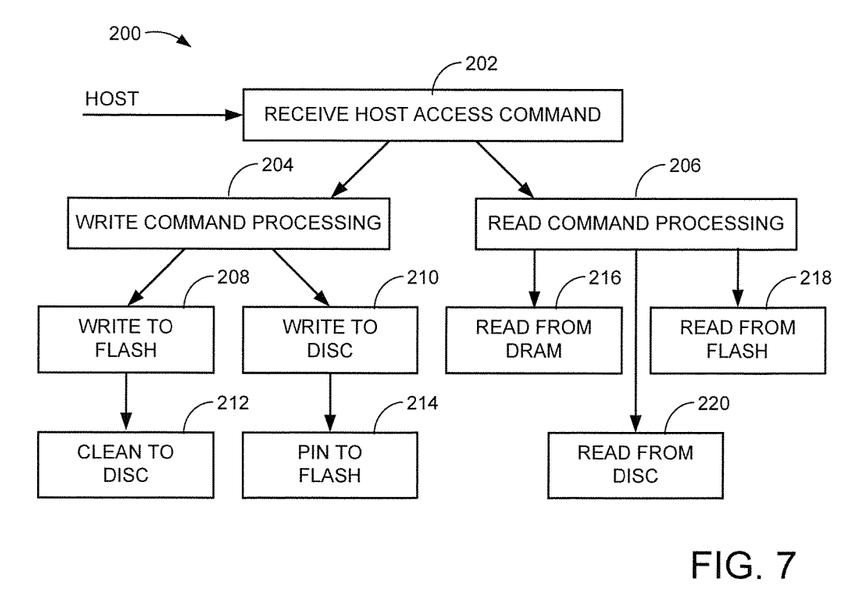
FIG. 7 illustrates a decision tree to provide an overview of various internal data transfers that take place by the storage device under the direction of the top level controller circuit of FIG. 4 in accordance with some embodiments.

FIG. 7 provides a decision tree structure 200 that can be used to illustrate decisions carried out by the top level controller 170 of FIG. 4 in managing various internal data transfers within the hybrid data storage device 100. Initially, host access commands are received from the host device at block 202. Such commands are initially processed by the top level controller circuit 170, including determining whether the command is a write command or a read command. The respective formats of the commands will depend upon a number of factors including the interface protocol employed by the hybrid device (e.g., SAS, SATA, Ethernet, etc.).

Each write command will include a host level logical address that uniquely identifies the data, along with a copy of the write data to be transferred to the hybrid storage device 100 (see e.g., FIGS. 6A-6B). Each read command will tend to include a similar host level logical address indicating the block or blocks of data that are requested to be forwarded to the host device.

Block 204 represents write command processing, and block 206 represents read command processing. Each kind of command is processed differently. Write command processing generally results in the writing of data either to the flash memory (block 208) or to the disc (block 210). The input write data associated with the write command are formatted and placed in the appropriate partition 174, 176 pending encoding and transfer. In addition, as noted above all data sets initially written to the flash memory will be subsequently scheduled for a cleaning operation to copy the data to disc, block 212. At least some data sets identified as high priority data will additionally be migrated, via a copy operation, to place a copy into the flash via the pinning operation identified at block 214.

The respective cleaning and pinning operations involve internally generated read and write operations to read the data from one form of memory (disc or flash) and to write the readback data to the other form of memory (flash or disc). This will include an operation by the top level controller 170 to transfer the read back data from one partition to the other within the DRAM 172.

To perform a cleaning operation as set forth by block 212, a read command is internally generated by the top level controller 170 and forwarded to the SSD controller 160. The requested data are retrieved from the flash memory 130 and the readback data are transferred to the SSD partition 176.

The top level controller 170 next transfers the data from the SSD partition 176 to the HDD partition 174 by copying over the data and freeing up the cache line utilized by the readback data. The top level controller issues a write command to the HDD controller 150 to write the data in the HDD partition to disc. The HDD controller 150 treats the cleaning write command as a normally received command and adds the command to the existing command queue for efficient execution.

A pinning operation as set forth by block 214 is carried out by the top level controller 170 initiating a read operation to transfer a copy of the pinned data from the disc media 110 to the HDD partition 174. The top level controller transfers the data from the HDD partition 174 to the SSD partition 176 and then issues a write command to cause the SSD controller 160 to write the transferred data to the flash media 130.

Continuing with FIG. 7, read command processing involves the top level controller 170 locating the data requested by the received read command. Provided the data have been resident in the data storage device long enough, a copy of all requested data will always generally be available from the disc memory 110. Faster access may be provided from the DRAM 172 or the flash memory 130, however, so part of the read command processing will include locating where the respective copy or copies of the requested data are located. In this way, the data may be retrieved as a cache hit from the DRAM (block 216), the flash memory (block 218) or the disc memory (block 220).

In some cases, the search involves a hierarchical strategy whereby the flash memory is checked first for the requested data; if so, the read command is forwarded to the flash memory section 130 for retrieval. If not in the flash, the HDD partition 174 is checked next to determine whether the data are resident in this partition, allowing a cache hit. If not resident in the HDD partition, the top level controller 170 forwards the read command to the HDD controller 150 for a retrieval operation from the disc media.

While the system can operate to similarly check the SSD partition 176, it has been found more efficient to simply retrieve the requested data from the flash as required. This simplifies both the search strategy as well as reducing the complexity of read caching algorithms that may be used to retain read data in the SSD partition in the hopes of obtaining a read cache hit. The speed with which data can be retrieved from the flash does not warrant the extra complexity in performing read caching management upon the SSD partition. On the other hand, due to the significant latencies that can be involved in returning data from the rotating media, read caching schemes are employed, such as a least recently used (LRU) approach, to manage valid readback cache data in the HDD partition 174.

The respective sizes of the HDD partition 174 and the SSD partition 176 can vary as required. In some cases, the two sizes are nominally the same (e.g., 8 MB each, etc.). In other cases, the HDD partition 174 may be greater in size or smaller in size to the SSD partition 176. The respective sizes of the partitions can further be adjusted over time based on workload characteristics. For example, a first ratio may be established so that a first portion of the available DRAM memory space is initially allocated for use as the HDD partition and a second portion of the available DRAM memory space is allocated for use as the SSD partition. The top level controller 170 monitors system operation and adjusts the respective ratio, such as by shifting some of one partition to the other, to optimize overall data transfer rate performance of the device 100. Shifting may be based on the Rains and types of data transfers (e.g., streamed data v. localized or small data sets), the form of data writes (flash intensive or disc intensive), and so on.

Figure 8:
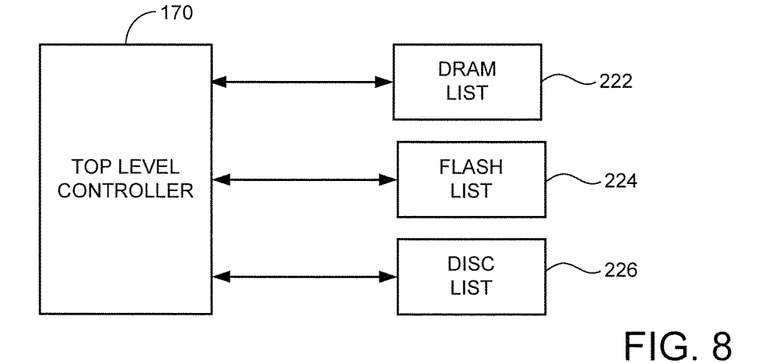
FIG. 8 illustrates various data structures maintained and used by the top level controller circuit in some embodiments.

FIG. 8 is a schematic illustration to denote various data structures that may be utilized by the top level controller 170 of FIG. 4 in some embodiments. Three such data structures are shown; a DRAM list 222, a flash list 224 and a disc list 226. These data structures may take the form of a linked list or other suitable data structure to reflect the respective data sets stored in each of the respective memories (DRAM 172, flash media 130 and disc media 110). The data structures may be stored in local memory, such as the DRAM 172 or other memory accessible by the top level controller 170. As noted above, the data structures may include host level logical or virtual addressing information, such as logical block addresses (LBAs), virtual block addresses (VBAs), key-block data values, etc. associated with the data. This allows the top level controller 170 to quickly and efficiently locate existing data sets and make determinations on where certain data are located to satisfy a read request, and to determine a suitable target location for the storage of input write data during a write request.

The DRAM list 222, if used, provides a listing of the contents of the respective HDD and SSD partitions 174, 176. As desired, a search of the LBA fields for the entries in each can be carried out directly so that a separate DRAM list is not necessarily required. This is particularly true since read caching algorithms may not necessarily be utilized for the SSD partition. Similarly, the disc list 226 may not necessarily be required since all data are (nominally) ultimately written to the disc media even if initially written to flash. It will be noted that the respective HDD and SSD controllers 150, 160 will maintain separate lists and conversion tables to enable these devices to locate data once an access command is forwarded by the top level controller 170.

Figure 9:
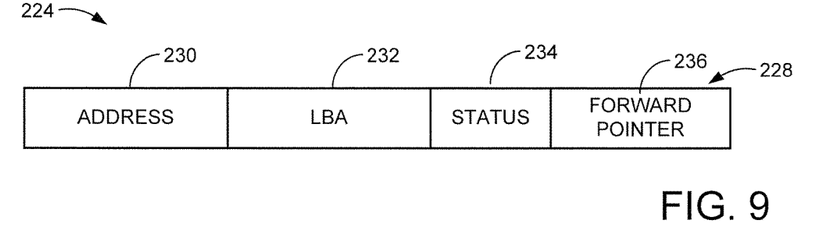
FIG. 9 is an exemplary format for the flash list data structure of FIG. 8.

An exemplary format for the flash list 224 is shown in FIG. 9. Other arrangements can be used. Generally, as discussed above one purpose of the flash list 224 is to enable the top level controller 170 to quickly and efficiently determine whether a given set of requested data are stored in the flash memory 130. Additionally, the flash list 224 also enables the top level controller 170 to construct and maintain a map structure of LBAs stored to the flash, allowing the controller 170 to make decisions with regard to whether a new set of data should be stored to flash.

The flash list 224 in FIG. 9 is made up of a number of entries 228, one of which is shown in FIG. 9. Each entry 228 may include an address field 230 indicative of the address of the data in flash, an LBA field 232 which lists one or more LBAs for the associated data block, a status field 234 which indicates the status of the data (e.g., current or stale, etc.), and a forward pointer field 236 which may be used to point to a different entry within the flash list. In this way, the flash list may be similar to metadata tracking structures utilized by the SSD controller 160 in managing the data stored to the flash.

Figure 10:
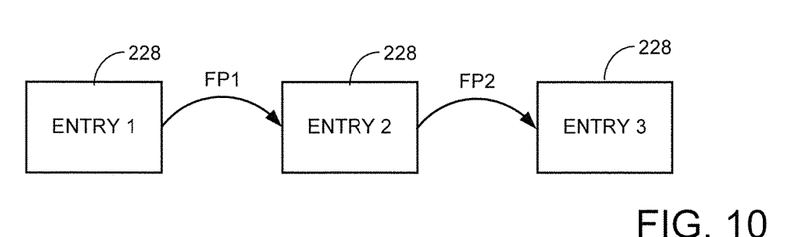
FIG. 10 illustrates the arrangement of the flash list as a linked list that uses forward pointers to locate a most current version of a given data structure in the device.
Figure 11:
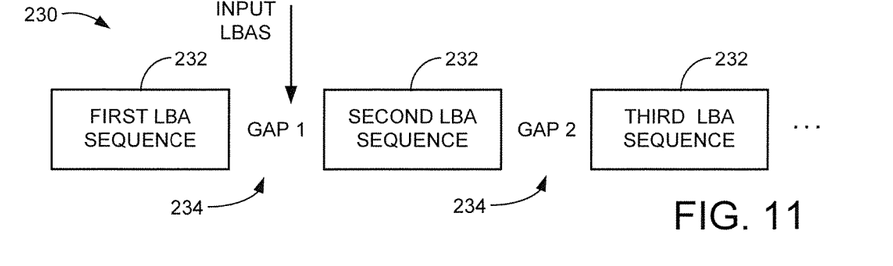
FIG. 11 shows a map structure as logical sequences of memory contents formulated by the top level controller circuit based on the data structures of FIGS. 8-10.

The forward pointers allow the controller 170 to locate the final version of the data and confirm that the most current version remains stored in the flash memory, as generally represented in FIG. 10. In this example, three entries utilize two forward pointers to locate the most current version of data as indicated by Entry 3. The status field 234 (FIG. 9) will indicate if this set of data represents the most current version of the LBA(s) in question. By sorting through the various entries in the flash list 224, a map structure 230 can be generated and maintained by the top level controller 230 in a suitable local memory, such as the DRAM 172, as represented in FIG. 11. The map structure 230 shows a logical map of LBAs stored in the flash memory. The map may be arranged as a set of contiguous sequences such as first, second and third LBA sequences 232 in FIG. 11. For example, the first LBA sequence 232 may represent LBAs from LBA 0 to X; second LBA sequence 232 may represent LBAs from LBA X+A to B; and the third sequence 232 may represent LBAs from LBA B+C to D. Additional sequences may be provided. Gaps 234 are provided between the respective sequences.

It follows that if the most recently received version of a given LBA is currently stored in the flash memory, then the top level controller 170 may operate to store a newest version of that same LBA in the flash memory as well. Additionally, based on proximity, an LBA that is close from a logical standpoint to an existing stored LBA may also be stored. Based on the sizes of the gaps, received data may be elected to be stored in the flash based on the map structure 230.

Figure 12:
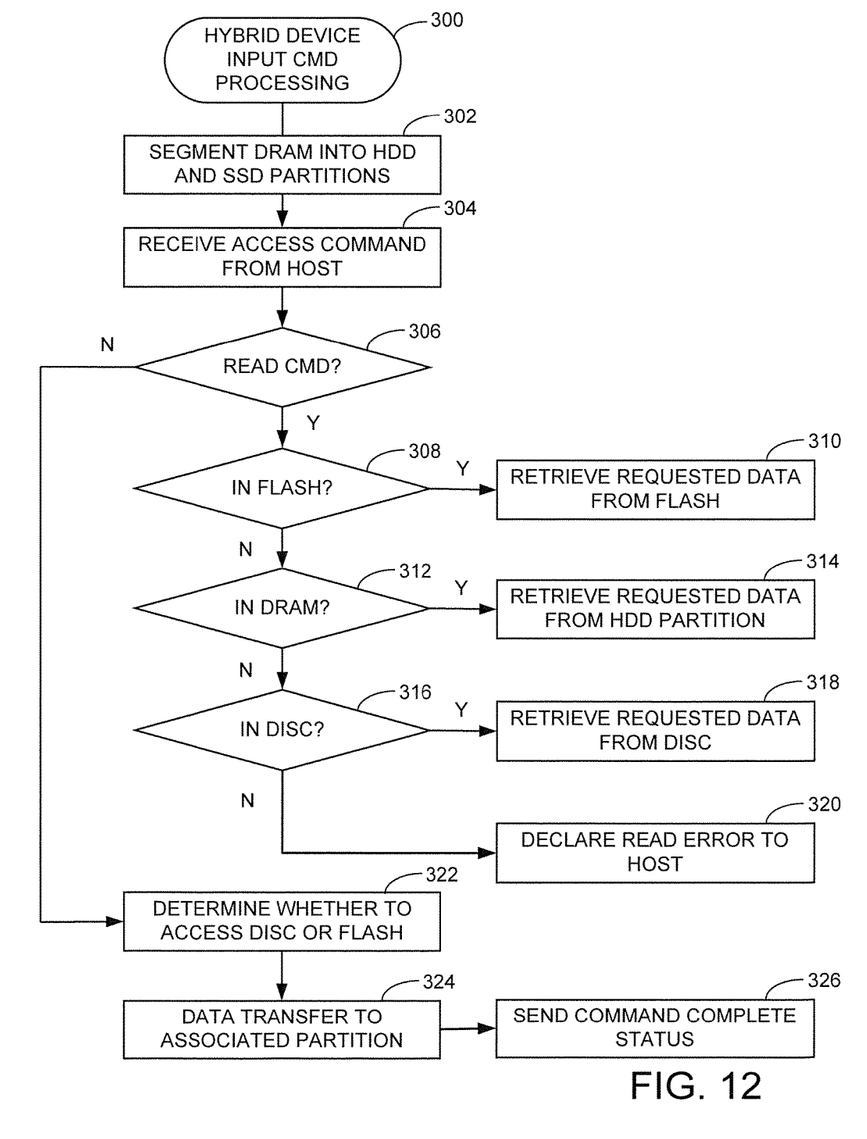
FIG. 12 is a flow chart for a hybrid device input command processing routine illustrative of steps carried out by the top level controller circuit in accordance with some embodiments.

FIG. 12 provides a hybrid device with partitioned local memory processing routine 300 illustrative of steps carried out in accordance with the foregoing discussion. It will be understood that the steps shown in FIG. 12 are merely exemplary and are not limiting, and various other steps may be added or appended as required. The various steps shown may be omitted, modified, carried out in a different order, etc. It is contemplated albeit not required that the steps shown in FIG. 12 may correspond to programming steps implemented, via suitable programming stored in memory, for the top level controller 170.

The routine commences at step 302 with the segmenting of the DRAM 172 (or other local memory) into separate HDD and SSD partitions, as discussed above in FIG. 5. This may be performed as a portion of a device initialization routine. Thereafter during normal operation an access command is received from a host device at step 304.

Decision step 306 determines whether the received host access command is a read command. If so, the flow proceeds to step 308 which determines whether the requested data associated with the read command is located in the flash memory 130. As discussed above, this can be carried out including by consulting, by the top level controller 170, a table structure stored in an appropriate memory location, including but not limited to the DRAM 172, that maps the contents of the stored memory on an LBA or other logical block basis (see e.g., FIGS. 9-11).

At such time that the requested data are found to be resident in the flash memory, the flow passes to step 310 where the data are retrieved therefrom and returned to the host.

The process continues at step 312 where it is determined whether the data, if not in the flash memory, are located in the DRAM 172. More particularly, as noted above this may involve a search of the HDD partition 174 of the DRAM since cache hits from the SSD partition 176 are not serviced in at least some embodiments. If the data are located in the HDD partition 174, a cache hit is made and the data transferred, step 314. It will be noted that the above two steps can be carried out in a different order than that shown in FIG. 12 as desired.

Continuing with FIG. 12, if the data are not located in either flash or the HDD partition, the flow continues to decision step 316 where the data are determined to be in the disc, and if so, the data are retrieved at step 318. As noted above, at this point in most cases all data will be resident on the disc unless it has been written to flash and not yet cleaned (transferred), in which case the data will have already been returned from the flash. Of course, if the data are unsuccessfully retrieved from any of these locations, a read error is declared and forwarded to the host at step 320.

The respective flash and disc read transfers generally involve the forwarding of the associated read command by the top level controller 170 to the appropriate HDD or SSD controller 150, 160 which processes the command in a suitable command queue and returns the data to the appropriate HDD or SSD partition 174, 176. A notification may be supplied by the HDD or SSD controller to the top level controller to enable the top level controller, in turn, to notify the host device that the data are ready. The data may be transferred automatically or the top level controller may wait for a request to transfer the data, depending on the interface protocol employed.

In such cases that the access command is a write command, the flow passes from step 306 to step 322 where the top level controller 170 determines whether to access the disc or the flash memory to satisfy the write command. The data are transferred by the top level controller 170 to the appropriate HDD or SSD partition at step 324 and the write command is forwarded to the appropriate HDD or SSD controller for execution. A command complete status is supplied by the top level controller at step 326.

Figures 13, 14:
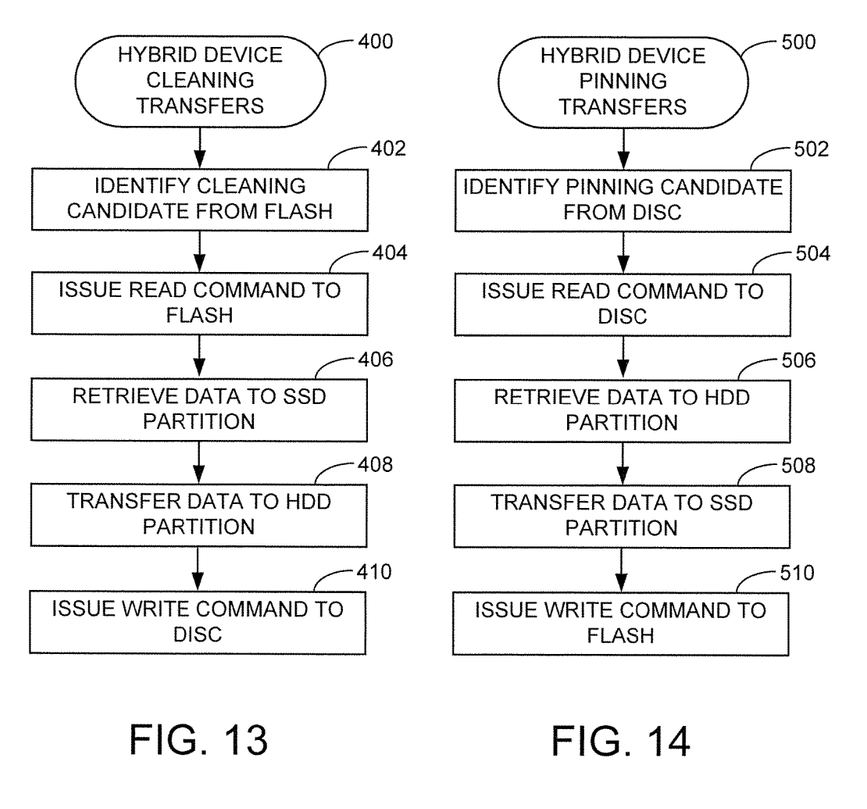
FIG. 13 is a flow chart for a hybrid device cleaning transfers routine illustrative of steps carried out by the top level controller circuit in accordance with some embodiments.
FIG. 14 is a flow chart for a hybrid device pinning transfers routine illustrative of steps carried out by the top level controller circuit in accordance with some embodiments.

Data cleaning and pinning transfers are handled in accordance with the respective flows of FIGS. 13 and 14. As before, these flow charts may represent programming utilized by the top level controller 170 in the background during device operation.

In FIG. 13, a data cleaning process 400 begins at step 402 with the identification of a suitable cleaning candidate data set to be transferred from the flash memory 130 to the disc memory 110. In some cases, a timer or other mechanism may be initiated to ensure that all data sets received by the device and initially written to the flash memory are copied over to the disc memory within a suitable time period. A cleaning list may be generated and maintained by the top level controller 170 to identify and track such sets.

At step 404, the top level controller 170 issues a read command to the flash to retrieve a copy of the data set. The SSD controller 160 in response executes the read command and places the retrieved data in the SSD partition 176, step 406. The top level controller 170 transfers the retrieved data from the SSD partition 176 to the HDD partition 174 at step 408, and issues a write command to the HDD controller 150 to write the data to an appropriate location on the disc media, step 410. Other steps may be taken as well. For example, responsive to a successful command complete notification from the HDD controller 150, the top level controller 170 may remove the entry in the cleaning list for that particular data set. As desired, the top level controller 170 may elect to maintain a copy of the data in the flash memory 130, or may instruct the SSD controller 160 to mark the data as stale (no longer current data). In the latter case, other data sets such as the flash list 222 may be updated as well.

Similar steps are carried out in reverse for a data pinning routine 500 in FIG. 14. Pinning candidates are selected at step 502 so as to have a copy of the data set stored in the flash memory 130 while retaining a copy in the disc memory 110. Selection for pinning can be based on a variety of reasons including existing data stored in the flash memory, a high host user interest in the data, etc.

Once selected, the top level controller 170 issues a read command to the HDD controller 150 at step 504, and in response the HDD controller schedules the read command and retrieves the data to the HDD partition 174. The top level controller 170 transfers the data to the SSD partition 176, step 508, and issues a write command to the SSD controller 160 to write the data to a suitable location in flash, step 510. As before, post transfer processing may take place including the updating of various data management structures maintained by the top level controller.

It will now be appreciated that the various embodiments presented herein can provide a number of benefits. By partitioning the local memory (DRAM, etc.), certain efficiencies in processing can be maintained since each of the lower level SSD and HDD controllers only access those portions of the memory dedicated to their use. Readback caching algorithms and management are simplified which reduces overhead and enhances data transfer rate performance, and data conflicts are avoided since the respective controllers are not in a position to attempt to access the same data set in the memory. Separate memory devices can be used to enhance the interaction among the controllers with the local memory.

Another benefit is that cleaning and pinning operations are easily carried out by the transfer of the data from one partition to the other by the top level controller. Each of the SSD and HDD controllers view the data transfers as "normal" transfers and can prioritize them accordingly using existing sequences used for host access commands.

The various embodiments presented herein have contemplated a hybrid storage device in which the main, slower memory is a rotatable media memory (e.g., rotatable magnetic recording discs) and the auxiliary, faster memory is a solid state memory (e.g., flash memory). In such case, the cleaning operation serves to transfer data from the relatively faster memory to the relatively slower memory. This is merely exemplary and is not necessarily limiting.

Other embodiments can use any suitable combination of respective memories, including but not limited to applications where the slower main memory is a first form of solid state memory (e.g., erasable flash memory, etc.) and the faster auxiliary memory is a different, second form of solid state memory (e.g., rewritable STRAM, RRAM, PCRAM, PLCs, etc.). In such case, there may be a benefit to use the top level controller circuit to use embedded queuing to schedule the transfers of data from the faster to the slower memory.

This would provide benefits consonant with those discussed above. It is noted, for example, that erasable memories such as flash memory are subjected to periodic garbage collection operations since each subsequent version of a set of data generally needs to be written to a new location, and metadata structures are usually employed to direct the system, such as via forward pointers, to the location of the latest version. Rewritable memories, on the other hand, can be overwritten with existing data and therefore may provide more efficient access, retrieval and management systems.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:
1. A hybrid data storage device comprising:
   a hard disc drive (HDD) controller circuit coupled to non-volatile rotatable storage media;
   a solid state drive (SSD) controller circuit coupled to non-volatile solid state memory;
   a local volatile memory having an HDD partition accessible by the HDD controller circuit and not accessible by the SSD controller circuit and having an SSD partition accessible by the SSD controller circuit and not accessible by the HDD controller circuit; and
   a top level controller circuit coupled to the respective HDD and SSD controller circuits and to the respective HDD and SSD partitions, the top level controller circuit configured to perform a pinning operation to transfer a data set from the rotatable storage media to the solid state memory by issuing a read command to the HDD controller circuit to retrieve the data set to the HDD partition, transferring the data set from the HDD partition to the SSD partition, and issuing a write command to the SSD controller circuit to write the data set from the SSD partition to the solid state memory.

2. The hybrid data storage device of claim 1, wherein responsive to at least one data update to the data set in the solid state memory to form an updated data set, the top level controller is further configured to direct a transfer of the updated data set to the rotatable storage media.

3. The hybrid data storage device of claim 1, wherein the top level controller circuit is further configured to receive host data transfer access commands from a host device, to direct a first portion of the access commands to the HDD controller circuit and to direct a remaining second portion of the access command to the SSD controller circuit, wherein user data transferred responsive to the first portion of the access commands are temporarily stored in the HDD partition and user data transferred responsive to the second portion of the access commands are temporarily stored in the SSD partition.

4. The hybrid data storage device of claim 1, wherein the top level controller circuit generates and uses a linked list with forward pointers stored in a memory to identify data sets stored in the non-volatile solid state memory.

5. The hybrid data storage device of claim 1, wherein responsive to a read command from a host device to retrieve a selected data set previously stored in at least a selected one of the non-volatile rotatable storage media or the non-volatile solid state memory, the top level controller circuit accesses a first data structure in a memory indicative of data sets stored in the non-volatile solid state memory and directs the read command to the SSD controller circuit responsive to the top level controller circuit determining a logical address associated with the read command is included in the first data structure.

6. The hybrid data storage device of claim 5, wherein responsive to the logical address associated with the read command not being included in the first data structure, the top level controller circuit further operates to determine whether the logical address associated with the read command is located within the HDD partition and directs a transfer of a data set stored in the HDD partition to the host device accordingly.

7. The hybrid data storage device of claim 6, wherein responsive to the logical address associated with the read command not being located within the HDD partition, the top level controller circuit further operates to direct the read command to the HDD controller.

8. The hybrid data storage device of claim 1, wherein the rotatable media comprises a magnetic recording disc and the solid state memory comprises a flash memory array.

9. The hybrid data storage device of claim 1, wherein the top level controller circuit emulates communications between the HDD controller circuit and a host device coupled to the hybrid data storage device.

10. The hybrid data storage device of claim 1, wherein the local memory is characterized as a dynamic random access memory (DRAM).

11. The hybrid data storage device of claim 1, wherein each of the top level controller circuit, the HDD controller circuit and the SSD controller circuit is characterized as a programmable processor that utilizes executable programming steps stored in an associated memory.

12. A computer implemented method comprising:
partitioning a local memory of a hybrid data storage device into a hard disc drive (HDD) partition and a solid state drive (SSD) partition, the HDD partition coupled to an HDD controller circuit coupled to non-volatile rotatable storage media, the SSD partition coupled to an SSD controller circuit coupled to non-volatile solid state memory, the HDD partition not accessible by the SSD controller circuit and the SSD partition not accessible by the HDD controller circuit; and
using a top level controller circuit adapted to process data access commands from a host device coupled to the hybrid data storage device to perform a pinning operation to internally transfer a data set stored in the non-volatile solid state memory to the non-volatile rotatable storage media by issuing a read command to the SSD controller circuit to retrieve the data set to the SSD partition, transferring the data set from the SSD partition to the HDD partition, and issuing a write command to the HDD controller circuit to write the data set from the HDD partition to the rotatable storage media.

13. The method of claim 12, further comprising:
retrieving the data set from the solid state memory to the SSD partition;
updating the data set in the SSD partition to form an updated data set;
storing the updated data set in the solid state memory; and
subsequently transferring the updated data set from the solid state memory to the rotatable storage media.

14. The method of claim 12, further comprising using the top level controller circuit receive host data transfer access commands from a host device into a memory, to direct a first portion of the access commands to the HDD controller circuit and to direct a remaining second portion of the access command to the SSD controller circuit, wherein user data transferred responsive to the first portion of the access commands are temporarily stored in the HDD partition and user data transferred responsive to the second portion of the access commands are temporarily stored in the SSD partition.

15. The method of claim 12, wherein responsive to a read command from a host device to retrieve a selected data set previously stored in at least a selected one of the non-volatile rotatable storage media or the solid state memory, the top level controller circuit accesses a first data structure in a memory indicative of data sets stored in the solid state memory and directs the read command to the SSD controller circuit responsive to the top level controller circuit determining a logical address associated with the read command is included in the first data structure.

16. The method of claim 15, wherein responsive to the logical address associated with the read command not being included in the first data structure, the top level controller circuit further operates to determine whether the logical address associated with the read command is located within the HDD partition and directs a transfer of a data set stored in the HDD partition to the host device accordingly.

17. The method of claim 16, wherein responsive to the logical address associated with the read command not being located within the HDD partition, the top level controller circuit further operates to direct the read command to the HDD controller.

18. The method of claim 12, wherein the rotatable media comprises a magnetic recording disc and the solid state memory comprises a flash memory array.

19. The method of claim 12, further comprising using the top level controller circuit to emulate communications between the HDD controller circuit and a host device coupled to the hybrid data storage device.

20. The method of claim 12, wherein the local memory is characterized as a dynamic random access memory (DRAM).

* * * * *